Feb. 10, 1953 J. H. ROE 2,628,279

AUTOMATIC PHASE CONTROL CIRCUIT

Filed March 31, 1949

INVENTOR
John H. Roe
BY Oliver C. Mitchell
ATTORNEY

Patented Feb. 10, 1953

2,628,279

UNITED STATES PATENT OFFICE 2,628,279

AUTOMATIC PHASE CONTROL CIRCUIT

John H. Roe, Collingswood, N. J., assignor to Radio Corporation of America, a corporation of Delaware Application March 31, 1949, Serial No. 84,705

7 Claims. (Cl. 178—69.5)

My invention relates to a phasing circuit and in particular to a circuit for maintaining constant phase relationships between a series of pulses and motor driven equipment.

When good average synchronism is required between operation of a synchronous motor and electronic devices, it is sufficient that they be driven from a common electrical power supply. However, for obtaining exact phase synchronism, such a method is unsatisfactory if the equipments have different inertias because a change in the magnitude or phase of the power supply voltage is not followed at the same rate by each piece of apparatus.

One obvious method by which this difficulty may be overcome is to use apparatus having the same inertia, but this presents difficult design problems and limits the type of equipment that may be used in a given system. My invention on the other hand produces good results when operated in conjunction with equipments having different inertias.

Another method that has been employed with success is the loading of equipment having relatively small inertia when the power supply tends to increase its speed and removing the load when the power supply tends to decrease its speed, but this necessitates maintaining an average load on the apparatus having the small inertia.

According to my invention the phase of one of the equipments being synchronized is altered by changing the conditions of operation in accordance with the changes in frequency or amplitude of the power supply. In this way equipment having different inertias can be synchronized without loading when transients are present in the power supply.

However, it is not intended, for reasons that will become apparent from a consideration of the detailed description below, that my invention be employed to maintain the average frequencies of varies apparatus at a constant value, but rather that it be used to maintain exact phase synchronism between various pieces of equipment during the occurrence of transient phenomena existing in a common power supply.

The problems discussed above are encountered in televising motion pictures as it is necessary to achieve exact phase synchronism between the motion picture projector and the control or "sync" pulse generator. In such equipment it is customary to project each frame of a motion picture film onto the target of the television pickup tube when the latter is not producing signals. More specifically, the picture is projected in a short pulse of light that normally occurs during vertical retrace time when the electronic beam is being moved back to the point where it starts scanning the target. If the light pulse from the picture projector, or any part of it, occurs during the scanning of the target in the pick-up tube, that part of the target scanned during the interval the picture is projected produces a much whiter background than is produced over the rest of the surface so that a horizontal white bar appears in the picture. Under some conditions of back-lighting in the pick-up tube, the bar can be black rather than white, but in either case the vertical position of the bar is determined by the amount of phase difference between the projector and the "sync" pulse generator as the latter determines when the scanning of the target begins.

In most of the systems for televising motion pictures, the movie projector and the electronic pulse generator are driven by a common power supply and the sync pulse produced by the generator not only controls the starting point of the frame scanning cycle at the pick-up tube but is transmitted with the video intelligence so as to control the scanning of the receiver. Until recently, satisfactory phase synchronism has been obtained by employing the method discussed above in which the mechanical inertia of the motion picture projector is made equal to the inertia of the sync pulse generator. However, recently promulgated standards have increased and required inertia of the sync pulse generator to such a degree that matching the mechanical inertia of the motion picture projector with the sync generator presents a difficult design problem.

My invention operates so as to develop a direct current voltage having a magnitude proportional to the difference in phase between the movie projector and the sync pulse generator, and this voltage is applied, through suitable amplifiers, so as to control the field excitation of the synchronous motor that drives the projector. If the direct current field of a synchronous motor is under excited, the rotor lags the rotating magnetic field produced by the stator and, conversely, if the direct current field is over excited, the rotor leads the rotating magnetic field. Therefore, in as much as the inertia of the synchronous motor and the projector is less than that of the sync pulse generator, the current supplied to the field by the phase comparator circuit should be less than the normal amount when the voltage or frequency of the common power supply changes in such a way as to cause the generator and projector to speed up, and greater than the normal amount when the power supply changes in such a way as to cause them to slow down.

By employing my invention, it is possible to achieve phase synchronism between the sync pulse generators and motion picture projectors having different inertias and thereby prevent white or dark bars from appearing in the televised image.

Accordingly, it is an object of this invention to provide a circuit for properly phasing a synchronous motor with a series of pulses.

A further object of this invention is the automatic control of the phasing of a television motion picture projector and a synchronous pulse generator.

It is a further object of this invention to provide rapid phase synchronizing between the pulse generator and the motion picture projector so as to eliminate distortion on the television screen.

Various other objects will become apparent from a detailed analysis of the drawing wherein—

Figures 3A, 3B:
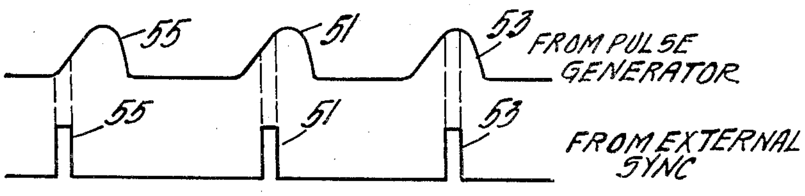

Figures 3*a* and 3*b* show graphically the operation of my invention.

Figure 1:
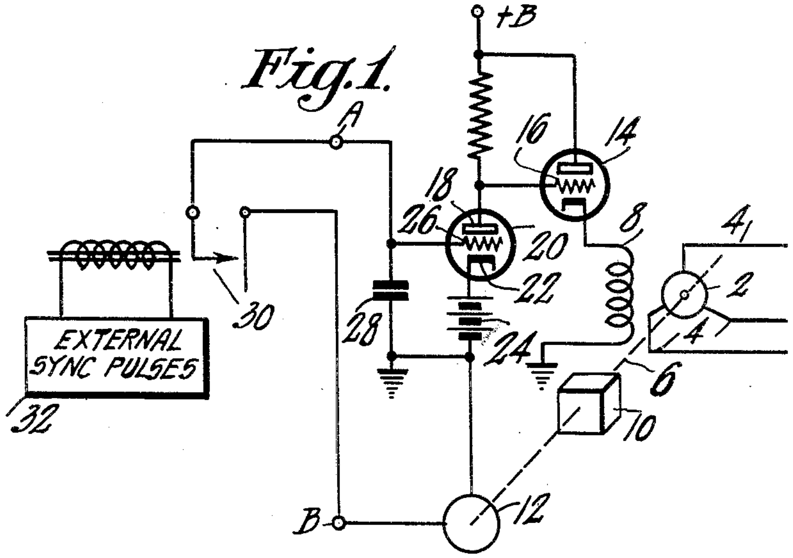
Figure 1 is a schematic diagram of the phase control circuit.

In Figure 1 there is shown a circuit for improving the phasing of electrical equipment in which numeral 2 indicates a synchronous motor having stator windings, 4, a rotor, 6, and a direct current field, 8. This motor may be used to drive any type of equipment indicated by rectangle 10, but in this particular instance the driven equipment is assumed to be a motion picture projector. Also driven by the rotor is a pulse generator 12, the output electrical wave form of which is illustrated in Figure 3*a*. The current in the direct current field 8 is controlled by direct current amplifier 14, and it is to be understood that several of these could be used in parallel in order to increase the current capacity. The grid 16 of tube 14 is connected directly to the plate 18 of tube 20. The cathode 22 of the latter tube is connected through a source of bias potential 24 to the pulse generator 12, the grid 26 being driven by the potential across condenser 28 which is connected between the grid and the junction between the pulse generator and source of bias potential. Although this junction is grounded, it is readily understood that ground could be located elsewhere. A normally open electromagnetic relay 30 remains closed in the presence of synchronous pulses that are provided from any source 32.

The amount of current flowing in the direct current field 8 is dependent on the charge maintained on condenser 28, and if the relay 30 is open, the pulses shown in Figure 3*a*, that are generated by the pulse generator 12, are not able to charge the condenser 28. However, when the pulses, such as shown in 3*b*, close relay 30 during the time that the pulses shown in Figure 3*a* are applied, the condenser 28 will be charged and the current in the direct field winding 8 is changed accordingly. Whereas this device is satisfactory for many purposes, it is limited to operation in the low frequency range because the relays now available are unable to follow high frequency impulses.

Figure 2:
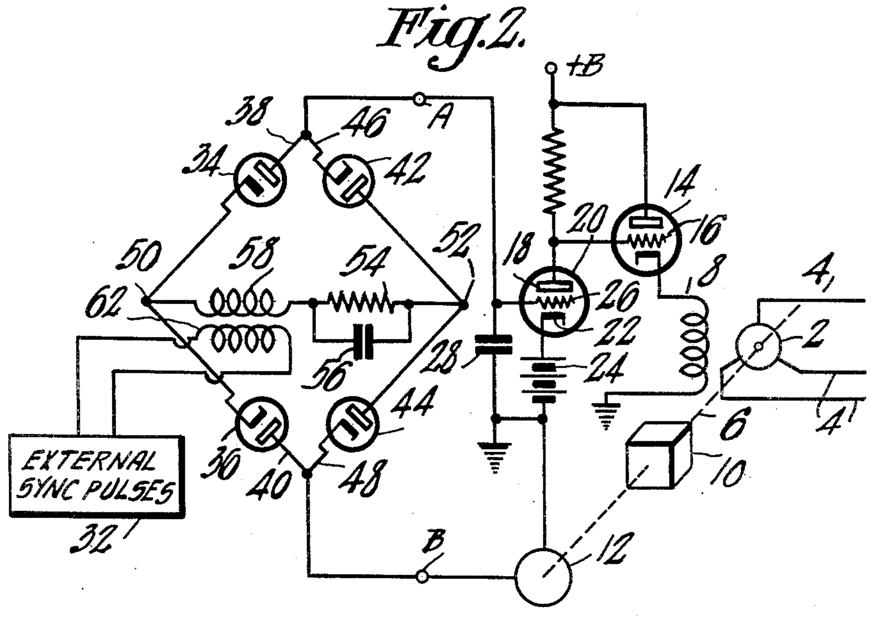
Figure 2 shows by circuit diagram another form of this invention.

In order to overcome this problem the rectifier bridge circuit shown in Figure 2 is connected at points A and B as shown. The rectifier bridge circuit of Figure 2 supplants the circuit of Figure 1 to the left of point A and point B and is an alternative therefor. One side of the bridge is composed of oppositely connected diodes 34 and 36, the plate 38 of diode 34 being connected to point A and the plate 40 of diode 36 being connected to point B. The other side of the bridge is composed of oppositely connected diodes 42 and 44, the former having its cathode 46 connected to point A and latter having its cathode 48 connected to point B. Between the diagonal points, 50 and 52, of the bridge there is connected a parallel R. C. network comprising resistor 54 and condenser 56 having a long time constant with respect to the duration of the longer of the pulses employed. In series with this R. C. circuit is a transformer secondary 58, the corresponding transformer primary 62 being connected to a source of external synchronous pulses 32.

Assuming that the output wave form of pulse generator 12 is that which is shown in Figure 3*a*, it can be seen that condenser 28 will be charged via the following path: diode 36, junction 50, junction 52 and diode 42, in such manner that the upper plate of the condenser will be positive and the electrons will be deposited on the lower plate. The condenser 56, however, will be charged so that the right hand plate is negative and the left hand plate is positive. Between the pulses shown in Figure 3*b* the condenser discharges through resistor 54 so that the right hand end of the resistor is negative and the left hand end is positive thereby keeping the diodes non-conducting between pulses. Now if the pulses shown in Figure 3*b* are of such polarity as to induce in secondary 58 a voltage that is opposed to that provided by the R. C. network, then it is seen that condenser 28 can be charged by the signals from generator 12, and if these pulses are of short duration with respect to the signals of generator 12, it can be seen that the amount of charge stored on condenser 28 will be determined by the relative phase between them. For example, the charge path is operative during the presence of the square pulses shown in Figure 3*b* and since the amount of charge stored on condenser 28 is dependent on the magnitude of the signal from generator 12 a greater charge is developed when the two waves are nearly in phase as shown at 53, than when they are out of phase as shown at 55.

It is necessary when unilateral devices such as diodes are used to provide a discharge path for condenser 28 because once the condenser is charged by the pulses of Figures 3*a* and 3*b* to a given value an increase in the phase difference between them from a phase such as shown at 51 to a phase such as shown at 53 would not reduce the condenser charge, and the current through the direct current field controlled thereby would remain the same. Condenser 28 is, therefore, discharged via the following path: B, diode 44, junction 52, junction 50 and diode 34, and A, because the voltage across condenser 28 is greater than the voltage of signal introduced by generator 12 and of such polarity that the charge path is nonconductive and the discharge path conductive.

The operation of the circuit is therefore seen to be as follows. Normally when the synchronous motor 2 is rotating at constant speed the relationship between the output signals from generator 12 and synchronous pulse generator 32 are as shown at 51 of Figures 3a and 3b respectively. Now if the phase of the power supply applied to stator 4 of the synchronous motor should lag, or in other words if the frequency should momentarily decrease, the signal developed in generator 12 would be advanced with respect to the power supply voltage and the rotating magnetic field because of the inertia of the shaft 6 and the driven equipment 10, but the synchronous pulses produced by generator 32 would lead by a greater amount because as stated above its inertia is greater than the mechanical inertia of the driven equipment 10 and naturally of the whole rotor 6. This means that the pulse shown in Figure 3b would advance in phase with respect to the pulse shown in Figure 3a as shown at 53 and accordingly, a maximum amount of voltage is developed across condenser 28, thus decreasing the amount of current in the field winding 8 and advancing the space phase of the rotor 6 with respect to the magnetic field produced by stator 4. Therefore, the rotor 6 and driven equipment 10 are returned nearly to the original phase relationship with generator 32 which it is remembered was less affected by the phase shift of the power supply frequency. The pulses from generator 12 and synchronous pulse generator 32 are thereby returned nearly to the initial point 51. It is obvious that an advance in phase of the power supply system would retard the rotor 6 and driven equipment 10 with respect to the stator field and advance it with respect to the sync pulse generator until the pulses are nearly in the phase shown at 51.

In order that the above system have its maximum effect it is desirable that the wave forms shown in Figure 3a be fairly steep in order that a maximum change in charge on condenser 28 can be produced with minimum change in relative phase between the wave forms. If the synchronous motor should be constantly losing or gaining in phase, it can be seen that this system cannot correct the change because once the pulse shown in Figure 3b occurs either to the right of the peak or the left of the zero point of the wave shown in Figure 3a, the charge stored on condenser 28 produces the opposite effect desired. Therefore, this system is designed to work in cooperation with a frequency control system and to provide very fine control capable of controlling phase relationships within a very few degrees.

Whereas this phase control circuit has been described in combination with a synchronous motor, it is readily adaptable to other types of driving equipment. However, because the limits of control described above are about the same as that of a synchronous motor, they are peculiarly well adapted to work together.

Having thus described the invention, what is claimed is:

1. A phase shift system comprising a source of a first group of pulses, a synchronous motor, a direct current field winding associated with said synchronous motor, means for supplying direct current to said winding, means for generating another group of pulses in constant phase relaship with the rotation of said synchronous motor, a means for developing an output control voltage having a magnitude determined by the phase relationship between said two groups of pulses, and a means for utilizing said control voltage to vary the current in said winding in such manner as to maintain the phase between the two groups of pulses at a constant value.

2. A phase synchronizing system comprising a synchronous motor, a direct current field winding associated with said motor, a source for supplying said field winding with direct current, an energy storage device, a signal generator driven by said motor, and a switch connected in series, a source of synchronizing pulses, means for placing said switch in conducting condition during said pulses so that the storage means is charged or discharged with energy depending on the relative potential levels of the signal generated and the existing energy potential on said storage means during said pulse interval, and means for controlling said source of direct current in accordance with the quantity of energy stored in said storage means.

3. A motor phase control system comprising a synchronous motor, a direct current field winding operatively associated with said motor, a motor shaft, a signal generator coupled to said shaft, a first pair of diodes connected in series, a second pair of diodes connected in series, parallel with said first pair, a transformer having a primary and a secondary, said secondary being connected in parallel with said diodes, connecting means between the output of said generator and the junction between the first pair of diodes, a source of signals with which the motor is to be synchronized, said source being connected to said primary, an output circuit, said circuit being connected between the junction intermediate the second pair of diodes and said field winding.

4. A phase synchronizing system comprising a prime mover, a signal generator driven by said prime mover, an energy storage element, and a switch connected in series, said switch comprising a bridge network, one side of said bridge having a first pair of diodes connected in series opposition, the other side of said bridge having a pair of diodes connected in series opposition and in the opposite sense to said first pair, one junction of said arms being connected to said storage means, the other junction of said arms connected to said signal generator, a parallel resistor capacitor network, a transformer secondary, said network and said secondary being connected in series between the junction points between each of said pairs of diodes, a primary in inductive relationship with said secondary, a source of pulses connected in circuit relationship with said primary, and a means for controlling the phase of said prime mover in accordance with the energy level in said storage means connected in operative relationship between said prime mover and said storage means.

5. A circuit for synchronizing a motion picture projector used in a television transmitter with the sweep synchronized pulses controlling the sweep of said transmitter pickup tube comprising a synchronous motor, a direct current field winding associated with said motor, a source of direct current potential connected to said field winding, a motion picture projector driven by said motor, a signal generator driven by said motor, a condenser, and a switch, said generator, condenser, and switch being connected in series, said switch comprising a bridge circuit having two arms connected in parallel, one having a pair of diodes connected in series opposition, the other having a pair of diodes connected in series parallel and in the opposite sense to said first mentioned pair, one junction of said arms being connected to one plate of said condenser, the other junction of said arms being connected to said pulse generator, a parallel resistor capacitor combination, and a transformer secondary connected in series between the midpoints of said arms, a primary connected in inductive relationship with said secondary, said primary being in circuit with said source of sweep pulses, and means for controlling said direct current source in accordance with the charge on said condenser.

6. In apparatus for maintaining a precise phase relationship between the rotation of a synchronous motor and pulses developed by an electronic circuit, the synchronous motor and the electronic circuit being operated by a common power supply and having different amounts of inertia, the combination of means for generating pulses having a constant phase relation to the rotation of said motor, a phase comparison circuit, said phase comparison circuit being coupled so as to receive the pulses supplied by said electronic circuit and said generating means and produce a control voltage indicative of the phase relationship between said pulses, a direct current field winding operatively included in said synchronous motor, and means for controlling the current flowing therein in response to said control voltage.

7. Apparatus as described in claim 6 having a phase comparison device that is adapted to pass current only when the pulses applied to it coincide, a condenser connected in series with said phase comparison device so as to be charged or discharged only when said phase comparison device is capable of passing current, said condenser being coupled so that the voltage across it is applied to the means for controlling the current on the D. C. field of the synchronous motor.

JOHN H. ROE.

REFERENCES CITED

The following references are of record in the file of this patent:

UNITED STATES PATENTS

| Number | Name | Date |
|---|---|---|
| 1,807,190 | Bock et al. | May 26, 1931 |
| 2,228,079 | Gulliksen | Jan. 7, 1941 |
| 2,399,421 | Artzt | Apr. 30, 1946 |
| 2,419,637 | Gabriel et al. | Apr. 29, 1947 |
| 2,428,946 | Somers | Oct. 14, 1947 |
| 2,443,195 | Pensyl | Jan. 15, 1948 |
| 2,474,829 | Curtis | July 5, 1949 |
| 2,474,886 | Bovey | July 5, 1949 |